July 7, 1953  K. T. HARTWIG ET AL  2,644,744
REACTOR FOR HIGH-TEMPERATURE CRACKING
Filed Feb. 26, 1951
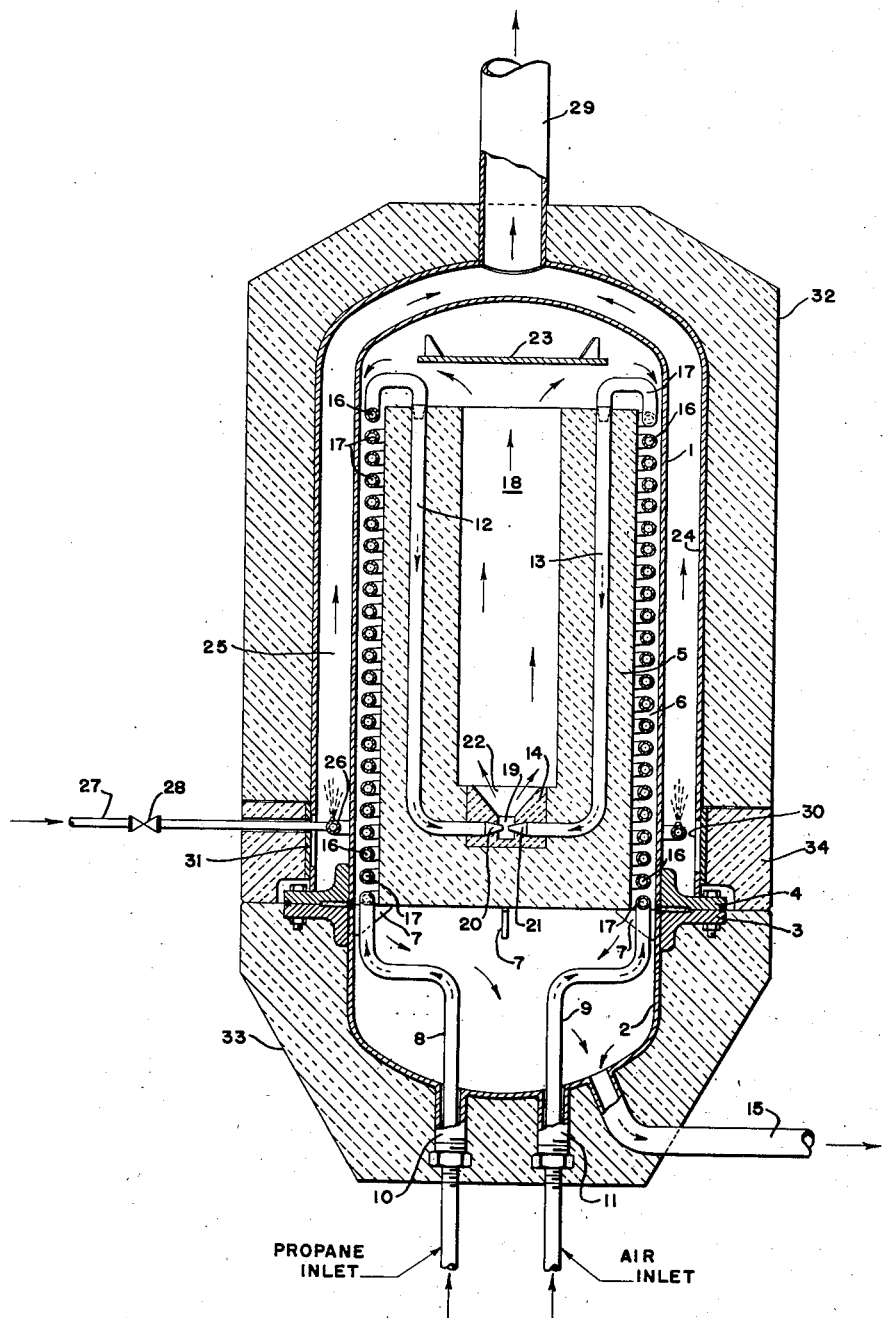
INVENTORS:
KARL T. HARTWIG
CHARLES H WATKINS
BY: *Chester J. Giuliani*
*Philip T. Liggett*
ATTORNEYS:

UNITED STATES PATENT OFFICE 2,644,744

REACTOR FOR HIGH-TEMPERATURE CRACKING

Karl T. Hartwig, Glen Ellyn, and Charles H. Watkins, Western Springs, Ill., assignors to Universal Oil Products Company, Chicago, Ill., a corporation of Delaware Application February 26, 1951, Serial No. 212,744

5 Claims. (Cl. 23—284)

The present invention relates to an improved reactor for effecting high temperature cracking, and particularly for providing rapid mixing and high temperature conversion of gaseous reactant streams under controlled conversion conditions.

A gas mixing and contacting apparatus or reactor, of the present type, may be used to advantage in many types of high temperature cracking or conversion operations. For example, the present reactor may be used to advantage in carrying out the autothermic or oxidative cracking of volatile hydrocarbon streams to produce ethylene, or other desired olefins, dienes, and the like. Also, a low molecular weight hydrocarbon stream such as propane may be preheated and mixed with preheated air or oxygen to effect the autothermic cracking of the propane into a product stream having a relatively low density and heating value making it desirable for use as a fuel gas or a supplementary "send-out" gas which may be used by companies to meet peak load demands. The efficiency of the autothermic process is primarily dependent upon the use of desirable form of apparatus which effects a rapid mixing and contacting of reactant gaseous streams, as well as means for controlling reaction time and temperature. Further, a desirable form of apparatus or reactor used in autothermic cracking, to effect high thermal efficiency, provides for heat exchange flows, whereby preheating of the reactant streams may be effected, and particularly the continuous preheating of reactant streams by a recuperative heating from a resulting product stream.

It is a principal object of the present invention to provide an autothermic or oxidative cracking type of reactor which is of a relatively simple design and construction, and has means for effecting recuperative heating so that the gaseous charge streams are preheated by a resulting gaseous product stream.

It is also an object of the present invention to provide an apparatus having the reactor chamber enclosed by and combined with an external heating chamber which provides a desirable means for insulating the reactor, and for providing operating temperature control, as well as starting-up temperature control.

It is still a further object of the present invention to provide a compact design and construction for an externally heated and recuperative type of autothermic reactor which provides a high thermal efficiency and may be readily assembled or disassembled for maintenance purposes.

Briefly, the present form of compact autothermic cracking reactor comprises in combination, an elongated pressure tight chamber having a refractory tubular member spaced concentrically and longitudinally therein, the tubular member being spaced from inner wall of the chamber and forming an annular shaped gas passageway therewith, a closed end and an open end to the tubular member and an elongated and axially positioned hollow portion therein forming a reaction section which is in open communication with the interior of the pressure tight chamber through the open end of the tubular member, a reactant stream inlet and an air inlet connecting with the pressure tight chamber at the end thereof adjacent to the closed end of the refractory tubular member therein, pipe coils extending from the inlets and positioned around the refractory tubular member within the annular shaped gas passageway, the pipe coils extending to the end of the tubular member having the open end therein and connecting with conduits extending longitudinally through the body of the tubular member to a mixing chamber positioned within the closed end of the tubular member, with the mixing chamber having ports therein connecting with the gas conducting conduits and discharging into a mixing throat, the latter connecting to and discharging through a flared portion of the mixing chamber into the axially positioned reaction section of the tubular member, whereby the resulting mixed gases and product stream may pass longitudinally through the reaction section and from the open end thereof into the enclosed chamber and reverse its flow to pass through the annular gas passageway in heat exchange relationship with the pipe coils positioned therein, product gas outlet means from the pressure tight chamber at the inlet end thereof, an enclosed and insulated heating chamber circumscribing and spaced from the pressure tight chamber forming an annular heating section therearound, gas burner and fuel supply means at one end of the heating section and adjustable air inlet means through the external heating chamber adjacent the burner means, and flue gas outlet means through the heating chamber at an end opposing the positioning of the burner means whereby hot flue gases may pass in indirect heat exchange with the enclosed pressure tight chamber.

Inasmuch as it is desirable in most high temperature cracking and conversion operations involving autothermic or oxidative cracking, to preheat the reactant streams to high preheat temperatures and to conserve heat within the processing unit, it is desirable to utilize recuperative heating, so the gaseous product stream gives up heat to the reactant streams. Thus, it is a desirable feature of the present invention to utilize extended pipe coils for accommodating the introduction of the hydrocarbon or other gaseous reactant stream and the air stream. The present invention provides heat exchange coils in an outlet gas passageway of annular shape, which, as noted, is positioned between an enclosing chamber and an inner-tubular member which in turn accommodates and encloses the reaction section. The reactant stream coils are also preferably placed in a continuous double helical coil arrangement maintained directly within the annular gas passageway space, so that there is an increased mass velocity for the outgoing product gas stream which gives rise to an increased heat exchange to the gaseous reactant streams in the pipe coils.

The present reactor also maintains in combination therewith a spaced and circumscribing heating chamber which provides an annular heating space to pass hot gases in external heat exchange relationship with the enclosed pressure tight chamber, with the external chamber being arranged so that it may be closed and insulated. Thus providing by means of a sealed space and insulating material the very efficient insulation of the internal conversion chamber. The external heating chamber may provide high temperature heating for use in effecting the starting-up of a particular reaction within the reaction chamber, for example, in autothermic cracking, reaction and conversion temperature may be reached by heat exchange to the reactant streams introduced through the pipe coils and into the reaction chamber. Also, if desired in oxidative cracking or other conversion reactions for mixed gaseous streams, continuous external heating may be provided around the enclosed conversion chamber during its operation.

A preferred embodiment of the present type of reactor also has at least one removable end to the pressure tight conversion chamber such that the reactant stream pipe coils and the inner tubular member may be readily placed and assembled or alternatively removed for maintenance purposes.

The construction and arrangement of the improved apparatus of this invention, as well as other advantageous features, for effectively and efficiently carrying out high temperature gas mixing and conversion operations will be more clearly shown upon reference to the accompanying drawing and the following description thereof.

Referring now to the drawing, there is indicated an elongated enclosed chamber 1, having in this particular embodiment, a removable lower end or head portion 2 which is connected to the main portion of the chamber by means of bolted flanges 3 and 4. The chamber 1 is of a pressure tight construction and of a refractory metal or alloy suitable for high temperature conversion operations, such as the autothermic cracking of ethane or propane at temperatures of the order of 1600° or 1700° F. Alternatively, steel or alloy materials may be lined with a suitable insulating or heat resistant material. Positioned internally within chamber 1 is a high temperature resistant refractory tubular member 5 and the latter is preferably spaced concentrically in the chamber so as to provide an annular-shaped gas passageway 6 therebetween. For purposes of easy assembly, the inner tubular member 5, is as indicated, supported on suitable brackets or lugs 7 which are attached to the inside of the lower head 2. Thus, the upper larger portion of chamber 1 may be pulled up and removed from around the tubular member 5 and the other internal portions of the apparatus.

Gas inlet conduits 8 and 9 are shown passing through the lower head 2 and into the interior of chamber 1 in order that they may discharge a mixed gaseous stream into the central reaction section as will hereinafter be described. Suitable packing glands 10 and 11 are provided for each of the inlet conduits in order that a desired superatmospheric pressure may be maintained within the interior chamber 1. Each of the reactant stream inlet conduits or pipes 8 and 9 pass upwardly through the annular gas passageway 6 and around the inner tubular member 5 to the upper end thereof, where they connect with internally positioned conduits 12 and 13 which pass downwardly through the body of the tubular member 5 and connect with a mixing chamber 14. Preferably, each of the pipes or conduits 8 and 9 pass in a helical coil arrangement around the tubular member 5, with the conduits winding in a parallel double helical coil until they reach the upper portion of the member 5. This arrangement provides for preheating the reactant stream in each of the conduits 8 and 9 by heat exchange with the resulting product stream which passes downwardly through the annular passageway 6 into the lower head 2 and out by way of conduit 15.

In order to describe the operation and use of the present apparatus, along with the description of its construction arrangement, it will be assumed that the improved reactor is to be utilized for effecting the continuous autothermic cracking of a low molecular weight hydrocarbon stream, such as propane, to provide a relatively low density resulting gas, which may be utilized as a fuel gas for supplementing a normal gas supply for peak load conditions, or to provide gas which may be mixed with natural or manufactured gas being sent out by gas supplying companies. In an ideal autothermic process, the air and hydrocarbon reactant streams pass through heat exchange means whereby they are preheated by the product gas to reach a suitable reaction temperature, and there is little or no loss of heat from the system, with the heat evolved by the exothermic reactions of combustion being absorbed by the endothermic reactions of cracking. In the present reactor, propane is indicated as being introduced into the apparatus by way of conduit 8 and helical 16, while air is introduced by way of conduit 9 and helical heat exchange coil 17. The double helical coils 16 and 17 extend upwardly through the relatively narrow gas passageway 6 and the reactor streams are preheated by heat exchange with the resulting product stream issuing from the reactor section 18. The relatively narrow gas passageway 6 provides a high mass velocity for the product stream and provides a relatively high heat transfer coefficient in the exchange of heat from the product stream to the reactant streams in the helical pipe coils. Thus, preheated propane is introduced from the coil 16 into the enclosed conduit or passageway 12 within the body of the tubular member 5, and a preheated air stream is introduced into the conduit 13 which also extends longitudinally through the body of the tubular member 5.

As previously noted, the reactant streams are introduced from the internal tubes or conduits 12 and 13 into a mixing chamber 14, however, in accordance with a preferred form of a gas mixing reactor of this type, the gas streams are preferably introduced into the chamber 14 in an opposing manner and with a high velocity. Thus, venturi shaped or otherwise restricted ports, such as 20 and 21, introduce the streams into a small diameter mixing throat 19 which in turn passes the resulting mixed gases at high velocity through a flared opening 22 directly into the elongated reaction zone 18. This reaction zone 18 is formed by an elongated hollow portion within the center of the tubular member 5 and an open upper end suitable to discharge into the upper end of the interior of chamber 1, whereby the resulting product stream must reverse its flow and pass downwardly through the restricted annular shaped gas passageway 6. In the autothermic cracking operation, the air burns a portion of the hydrocarbon stream, or in this instance propane, in order to provide high temperature combustion products which in turn effect the cracking of the remaining portion of the propane stream, with resulting relatively large quantities of ethylene, propylene, and hydrogen, and with little or no significant formation or undesirable products.

The air to hydrocarbon ratio may of course be varied to change the resulting product stream and to vary the B. t. u. value of the resulting gas. In the mixing chamber 14 and in the lower portion of the reaction section 18, the gas mixture may rise to a temperature of the order of 1900° F. before the combustion reactions are overtaken by cracking reactions which reduce the temperature to the order of 1500° F. The mixing chamber and the mixing throat thereof is designed to provide a high degree of turbulence so that there is rapid relatively homogeneous mixing of the reactant stream. The reactor of the present design may of course utilize a refractory type of packing material within the elongated reaction section 18 where it is desirable to provide further mixing and turbulence of the stream passing upwardly through the interior zone and prior to reaching the annular-shaped passageway 6. Also, if desired, a suitable deflector plate, such as alloy plate 23, spaced above the top of the reaction section 18, may be used to prevent the direct impingement of the hot gaseous product stream against the top of the chamber 1 and to deflect the resulting product stream downwardly through the gas passageway 6.

It is a particular feature of the present autothermic reactor to utilize an enclosing or circumscribing heating chamber 24 spaced around chamber 1. The external chamber 24 is spaced concentrically around chamber 1 to provide an annular heating section 25. A continuous burner ring 26 is positioned within the lower portion of heating section 25 and is supplied with a suitable fuel gas by way of line 27 and control valve 28. Thus, high temperature combustion gases may be provided within the heating section 25 and pass upwardly around and in heat exchange relationship with the inner chamber 1 so that the interior of the latter may be brought up to a high temperature suitable to start the autothermic cracking reaction. Combustion and fuel gases from the heating chamber 25 may be discharged by way of an outlet stack 29. Air suitable to sustain burning of fuel gas from the burner ring 26 may be supplied by way of ports or openings 30 in the lower portion of the chamber 24 and by means of movable or slidable doors 31, which are placed over the ports 30 when the burner ring 26 is not in operation. One or more layers of heat retaining insulation is used externally around the chamber 24 and around the lower head 2 of the conversion chamber. Preferably, the covering insulation is in two sections with a joint or splice somewhere near the line of the flanges 3 and 4 so that the enclosing heating chamber 24 may be lifted up and removed from the inner chamber 1 and insulation 33 retained on the lower head 2. Also suitable movable insulation 34 may be placed adjacent the movable door members 31 so that air may be adjustably introduced into the lower portion of the heating section 25.

A two way advantage is obtained by the present construction arrangement having the external circumscribing heating section around the conversion chamber. For starting up purposes, a suitable fuel gas may be burned in the heating section 25 and a high temperature provided for heating up the interior of the conversion chamber 1 and preheating the reactant streams in the coils 16 and 17 so that they may reach a temperature sufficient to sustain the autothermic reaction. This arrangement eliminates the necessity of a sparking coil or other igniting means placed within the body of the reactor itself to start or initiate combustion of the mixed gas reactant streams in the mixing chamber 14 or the lower portion of the reaction section 18. During normal operation of the autothermic reactor, the stack or vent 29 may be closed off and the inner heating space 25 provide a substantially dead-air space as added insulation for the conversion chamber 1, being in addition to the external heating chamber 24 and insulating material 32. Alternately, a small quantity of fuel gas may be continuously burned from the ring 26 and thus maintain a continuous flow of hot combustion gases externally along the wall of chamber 1 so that the coils 16 and 17 internally within the chamber 1 but closely adjacent to the wall 1 are insured of having a desired high temperature and a desired preheating of the reactant gas streams prior to their being introduced into the mixing chamber 14. Thus, the present apparatus provides not only a compact design and arrangement for a recuperative type of reactor having the hot product gases passing in heat exchange with the reactant streams, but means for providing an external source of heat to use in starting-up the conversion process or to maintain ideal highly efficient operating conditions.

The present drawing of the improved apparatus is of course diagrammatic and minor modifications may be made in connection with various details of the unit. Additional or auxiliary features may of course be added to the unit, such as for example, thermo-well connections may be utilized in connection with the reactor in order to connect suitable thermocouples with various internal zones in the apparatus for determining critical temperatures during the operation of the unit. The use of suitable packing material, such as heat resisting porcelain Raschig rings within the elongated reaction section 18 has been hereinbefore noted, however, it is also within the scope of the present invention to utilize a catalytic material within the reaction section, whereby there is aid in effecting a particular conversion operation within the present improved form of gas mixing apparatus.

We claim as our invention:

1. A recuperative type of reactor comprising in combination, an enclosed elongated chamber having a refractory tubular member positioned concentrically and longitudinally therein, the refractory walls of said tubular member being spaced from said chamber and forming an annular-shaped gas passageway therebetween, said tubular member being open at one end and having a relatively thick refractory closure at its opposite end spaced from the corresponding end of said chamber with an elongated axially positioned inner hollow portion forming a reaction section therein, said reaction section communicating through the open end of said tubular member directly with the interior of said enclosed chamber, reactant stream inlets connecting with said elongated chamber adjacent the closed end of said tubular member, pipe coils extending from said inlets around said tubular member and positioned within said annular gas passageway, said coils extending to the end of said tubular member and connecting with internal conduits embedded in and extending longitudinally through the refractory walls of said tubular member to the inlet ports of a mixing chamber formed within said relatively thick end closure of the tubular member, said ports connecting to and discharging into a mixing throat of said mixing chamber and said mixing throat discharging a resulting mixed gaseous stream through said mixing chamber into said inner reaction section of said tubular member, a gas outlet from said chamber at the inlet end thereof, an insulated heating chamber spaced from and circumscribing said enclosed chamber and providing an external annular heating section, a gas burner and fuel supply means at one end of said heating section, adjustable air inlet means through said heating chamber adjacent said burner, and flue gas outlet means from said heating chamber at an end thereof away from said gas burner whereby hot combustion gases pass in heat exchange flow over said enclosed chamber.

2. The reactor of claim 1 further characterized in that said pipe coils extending from said inlets around said tubular members are positioned in a double helical coil arrangement coextensive for substantially the full length of said inner tubular member.

3. The reactor of claim 1 further characterized in that said enclosed elongated chamber is constructed of a heat resistant metal permitting the substantially rapid transfer of heat from said external heating section into the interior thereof for preheating said reactant streams within said pipe coils.

4. A combination recuperative and externally heated reactor for effecting high temperature cracking of reactant streams, comprising in combination, an elongated vertically disposed pressure tight conversion chamber having a removable lower portion, an elongated refractory tubular member positioned concentrically and longitudinally within said chamber in a manner forming an annular-shaped gas passageway with the inner wall of said conversion chamber, said tubular member having a relatively thick end closure spaced from said removable lower portion of the chamber, the tubular member being open at its opposite end and providing an elongated axially positioned inner hollow portion forming a reaction section, said reaction section being open to the inner portion of said chamber and to said annular shaped gas passageway through the open end of said tubular member, a reactant stream inlet and an air stream inlet passing through said removable end portion of said elongated chamber, each inlet separately connecting with helical pipe coils extending around said elongated tubular member and positioned within said annular-shaped gas passageway, said helical coils arranged in parallel double coil arrangement coextensive to the end of said tubular member having the opening therethrough, with said helical coils separately connecting with internal conduits embedded in and extending longitudinally through the walls of said tubular member into a mixing chamber formed within said relatively thick end closure of the tubular member, said mixing chamber being positioned adjacent to and communicating with the inner end of said reaction section within said tubular member, said mixing chamber having restricted inlet ports connecting with said internal conduits and discharging in an opposing manner into a small diameter mixing throat positioned concentrically within said mixing chamber, whereby said mixing throat and said mixing chamber discharge a resulting mixed gaseous stream directly into and axially through said reaction section, a product gas outlet from the removable end portion of said closed chamber and adjacent the gas inlets therethrough, whereby the resulting gaseous product stream from said reaction section reverses its flow and passes through said gas passageway around said elongated tubular member and through the inlet end of said closed chamber, an insulated heating chamber spaced from and circumscribing said enclosed pressure tight chamber, said heating chamber forming thereby an external annular heating section around said enclosed chamber, a continuous burner ring within the lower end of said heating section and air and fuel gas supply means through said heating chamber to said burner ring, flue gas outlet from said heating chamber at the upper end thereof whereby hot gases flow around substantially the full length of said enclosed chamber in heat exchange therewith, adjustable and movably positioned inlet doors through the heating chamber at a zone adjacent said continuous burner ring to provide means for adjustably introducing air to the latter.

5. A reactor comprising an elongated chamber, a tubular member positioned concentrically and longitudinally in the chamber and having a relatively thick refractory body portion spaced from the chamber walls and a relatively thick refractory end closure spaced from the corresponding end of the chamber, the opposite end of the tubular member being open to provide communication between the interior of said member and the annular space between said body portion and said chamber, reactant stream inlets extending through said end of the chamber, pipe coils connected to said inlets and positioned in said annular space around said body portion of the tubular member, a mixing chamber formed within said relatively thick end closure and discharging into the interior of the tubular member, gas conducting conduits embedded in said body portion of the tubular member and connecting said pipe coils with said mixing chamber, and a gas outlet from said end of the first-mentioned chamber.

KARL T. HARTWIG.
    CHARLES H. WATKINS.

References Cited in the file of this patent

UNITED STATES PATENTS

| Number | Name | Date |
|---|---|---|
| 1,154,869 | McHenry | Sept. 28, 1915 |
| 1,744,750 | Cicali | Jan. 28, 1930 |
| 1,757,855 | Chilowsky | May 6, 1930 |
| 2,319,508 | Leprestre et al. | May 18, 1943 |
| 2,446,309 | Starr | Aug. 3, 1948 |
| 2,529,598 | Deanesly | Nov. 14, 1950 |

FOREIGN PATENTS

| Number | Country | Date |
|---|---|---|
| 5,510 of 1927 | Australia | Jan. 11, 1927 |